3,493,594
FERROUS MALATE TRIHYDRATES AND PREPARATION

Wallis R. Bennett and Robert D. Goodenough, Midland, Mich., assignors to The Dow Chemical Company, Midland, Mich., a corporation of Delaware
No Drawing. Filed Jan. 17, 1968, Ser. No. 698,419
Int. Cl. C07f *15/02;* A61k *27/00*
U.S. Cl. 260—439                                        4 Claims

ABSTRACT OF THE DISCLOSURE

New compounds, ferrous DL-malate trihydrate and ferrous L-malate trihydrate, having the chemical formula $Fe(C_4H_4O_5) \cdot 3H_2O$, and methods of preparation have been invented. The compounds are useful in overcoming hypochromic anemia in piglets.

BACKGROUND AND SUMMARY OF THE INVENTION

A substantially non-irritating, relatively non-toxic, oxidation stable, tasteless or bland ferrous compound useful in treating hypochromic anemia in piglets has long been desired. Such compounds have now been invented in the forms of ferrous DL-malate trihydrate and ferrous L-malate trihydrate, having the chemical formula $Fe(C_4H_4O_5) \cdot 3H_2O$. They are prepared by crystallization from aqueous solutions of ferrous ions and malate ions.

DETAILED DESCRIPTION OF THE INVENTION

According to the present invention, the new compounds, ferrous DL-malate trihydrate and ferrous L-malate trihydrate, have been found to be useful in treating hypochromic anemia in piglets.

The compounds of this invention can be made by two different procedures. In the first method, iron powder, minus 100 U.S. mesh, is reacted with a malic acid solution, either DL-malic or L-malic acid. The reaction is advantageously carried out at a temperature of about 90–100° C. followed by filtration and concentration to incipient crystallization and cooling to a temperature ranging between about 10° and 50° C., preferably about 10° C., whereupon ferrous DL-malate or L-malate trihydrate crystallizes out. At the lower end of the temperature range only a very minor proportion of the desired product remains in solution. Since the reactant ferrous iron and malic acid react in stoichiometric proportions, i.e., one mole of malic acid to one mole of iron, substantially such proportions are advantageously used. However, since some of the desired product forms no matter what proportions of reactants are used, it is not essential that stoichiometric proportions be reacted. It is advantageous in the reaction to use an aqueous solution containing from about 5 to about 15 weight percent malic acid. The finely divided iron powder, advantageously minus 100 U.S. mesh, is stirred into the malic acid solution which is then heated to the desired reaction temperature. An atmosphere of an inert gas, e.g., nitrogen, is maintained in the reaction vessel. Hydrogen gas is given off during the reaction. When hydrogen gas ceases to be evolved, the reaction is complete. When reaction ceases or substantially ceases, the reaction medium is filtered to remove any unreacted iron and the filtrate is concentrated by evaporation to incipient crystallization, usually to about one-third of its volume. The solution is thereafter cooled to about 10° to 50° C., whereupon ferrous DL-malate or L-malate trihydrate crystals precipitate out. The crystalline product is filtered off and dried in a vacuum oven at ca. 29 inches of mercury vacuum at 35° C. under a nitrogen or other inert gas atmosphere.

In an alternative procedure, ferrous chloride or other ferrous salt of a non-oxidizing acid is reacted with sodium or other alkali metal or ammonium salt of malic acid, advantageously in substantially stoichiometric proportions, and the reaction medium is thereafter treated as in the first method. In this process, a sodium DL-malate solution, for example, containing from about 25 to about 40 weight percent of sodium malate is reacted with a ferrous chloride solution advantageously containing from about 35 to about 40 weight percent of ferrous chloride. The reaction is advantageously carried out by adding the sodium malate solution and the ferrous chloride solution simultaneously to the reaction vessel with agitation. In this method of reaction, the reaction temperature is advantageously maintained between about 20° and 40° C. Crystallization may be carried out at 10°–50° C.; however, at 10° C. a higher yield of ferrous DL-malate or L-malate trihydrate is obtained due to the decreased solubility of the product at the lower temperature. The product is recovered as in the first process.

The following examples describe completely representative specific embodiments and the best modes contemplated by the inventors of carrying out their invention.

Example 1.—Malic acid-iron powder reaction 4.02 grams of DL-malic acid is dissolved in 50 milliliters of water in a 100 milliliter test tube. To this solution is added 1.2 grams of pure iron powder (−100 U.S. mesh) and the batch is heated to 98° C. An atmosphere of nitrogen gas is maintained in the test tube during the reaction. Hydrogen gas is given off during the reaction. When practically all of the iron has reacted, the hot solution is filtered. The filtered solution is evaporated to about one-third its volume and cooled to ca. 10° C. The ferrous DL-malate crystals precipitate out and are filtered off. The crystals are dried in a vacuum oven maintained at 35° C. at 29 inches Hg vacuum under a nitrogen gas atmosphere.

*Analysis.*—Actual: Total Fe, 23.4%; $Fe^{++}$, 23.1%; C, 20.49%; Total H, 4:29%; $H_2O$, 22.78%; H (organic), 1.76%. Theory: Total Fe, 23.1%; $Fe^{++}$, 23.1%; C, 19.9%; Total H, 4.13%; $H_2O$, 22.35%; H (organic), 1.65%.

L-malic acid is substituted for DL-malic acid to give the corresponding ferrous L-malate trihydrate.

Example 2.—Sodium malate-ferrous chloride reaction 330 grams of DL-malic acid are dissolved in 778 grams of boiled distilled water. The above malic acid solution is reacted slowly with 372 grams of aqueous 50 percent NaOH (low salt grade), not allowing the temperature to rise above 40° C., to form a sodium DL-malate solution. The sodium malate solution is cooled to room temperature and gravity filtered through Whatman No. 1 filter paper. The resulting sodium malate solution is reacted with 817 grams of 36.7 percent $FeCl_2$ solution, filtered just before using, under a nitrogen atmosphere. This amount of $FeCl_2$ is 5 percent short of the theoretical amount. The reaction is carried out by adding the sodium malate solution and the ferrous chloride solution simultaneously to a reactor flask with agitation. The feed rate for the sodium malate solution is 3.3 milliliters per minute while that of the ferrous chloride solution is 1.6 milliliters per minute. At these feed rates, it takes six hours to complete the addition of the solutions. The reaction temperature is maintained at approximately 25° C. The batch is held overnight and cooled to 10° C. The batch is split in half and two filtrations made using a Buechner filter. Each batch of crystals is washed with two 220 milliliter portions of cold, boiled distilled water followed by 125 milliliters of SDA–3A alcohol. The washed, sucked-dry crystals are placed in a glass tray 6 in. by 10 in. to give an approximately ¾ in. depth of crystals. The tray is placed in a vacuum oven and the crystals dried to a produce temperature of 45° C. under 29 inches Hg vacuum. A nitrogen atmosphere is maintained in the oven. The crystals are ferrous DL-malate containing three moles of water of hydration, having the formula $Fe(C_4H_4O_5) \cdot 3H_2O$. The product made by the above method contains 23.5–24.0 percent iron of which 96–99 percent is in the ferrous state.

L-malic acid is substituted for DL-malic acid in the preceding procedure to give the corresponding ferrous L-malate trihydrate.

Example 3.—Ammonium malate-ferrous chloride reaction 35.7 grams of DL-malic acid is dissolved in 200 milliliters of distilled water and added to 102.3 grams of 36.9 percent ferrous chloride and heated to 70° C. This solution is neutralized with 39.8 grams of aqueous 28 percent $NH_3$ solution to a pH of 6.3. An atmosphere of nitrogen is maintained throughout the reaction. The neutralized solution is cooled to 10° C. A few crystals are obtained when the solution is filtered. Upon standing overnight, more crystals appear and are filtered off and dried in a vacuum oven at 29 inches Hg vacuum maintained at 37° C. under a nitrogen atmosphere. The analysis of the crystals is as follows:

From 1st filtration: Total Fe, 25.6; $Fe^{++}$, 23.8%.
From 2nd filtration: Total Fe, 23.5; $Fe^{++}$, 23.0%; C, 19.68%; H, 4.17%.

L-malic acid is substituted for DL-malic acid to give the correpsonding ferrous L-malate trihydrate.

The ferrous malate trihydrates of this invention are substantially stable against air oxidation at room temperature and are substantially non-hygroscopic. Ferrous DL-malate monohydrate as shown by the following table, is not air oxidation stable and is hygroscopic.

The procedure of Example 2 is followed to prepare ferrous DL-malate trihydrate. The product obtained is divided into two parts, A and B, the B part being dried at 100° C. under 29 inches of Hg vacuum to give ferrous DL-malate monohydrate, the A part having been dried at 45° C. under 29 inches of Hg vacuum to give ferrous DL-malate trihydrate, a nitrogen atmosphere being maintained in the drying oven in each instance.

The products obtained have the following analyses:

TABLE A

| Part | Total Fe | $Fe^{++}$ | Percent $Fe^{+++}$ (by diff.) | Total Fe as $Fe^{++}$ | X-Ray Diffraction Analysis |
|---|---|---|---|---|---|
| A | 23.07 | 23.07 | 0.0 | 100.0 | Trihydrate. |
| B | 26.70 | 23.27 | 3.43 | 86.8 | Monohydrate. |

Weighed samples of the ferrous malate hydrates are exposed to room air in open weighing bottles and stirred twice daily. At the end of various time periods, the samples are reweighed and iron analyses and weight changes are determined, as shown in the following tables.

TABLE B

| Part | Hours air exposed | Percent $Fe^{+++}$ original weight basis | Percent increase in Percent $Fe^{+++}$ |
|---|---|---|---|
| A | 0 | 0 | 0 |
| B | 0 | 3.43 | 0 |
| A | 24 | 0 | 0 |
| B | 24 | 3.46 | 0.88 |
| A | 48 | 0 | 0 |
| B | 48 | 3.48 | 1.46 |
| A | 120 | 0 | 0 |
| B | 120 | 4.12 | 20.1 |
| A | 192 | 0 | 0 |
| B | 192 | 4.20 | 22.5 |
| A | 360 | 0 | 0 |
| B | 360 | 5.85 | 70.6 |
| A | 528 | 0 | 0 |
| B | 528 | 7.34 | 114.2 |

TABLE C

| Part | Hours air exposed | Percent weight increase |
|---|---|---|
| A | 288 | 0.00 |
| B | 288 | 14.96 |

X-ray diffraction analyses show that the air exposed monohydrate salt is changing to the trihydrate, i.e., that the weight increase is due to water pickup. The ferrous L-malate trihydrate has substantially similar air oxidation resistance and lack of hygroscopicity as that of the ferrous DL-malate trihydrate.

A quantity of ferrous DL- or L-malate trihydrate is dispersed in corn syrup to provide a composition containing 0.10 percent by weight of iron salt. The composition is applied about the udders of a sow. Thereafter, pen-raised nursing piglets from 1 to 3 days old are allowed to ingest said composition in the normal manner. The procedure is repeated once a week until the piglets are four weeks old. Such ingestion of corn syrup containing 0.10 percent by weight of ferrous DL- or L-malate trihydrate prevents hypochromic anemia, to which piglets raised in pens are susceptible.

What is claimed is:
1. In a method for making ferrous malate wherein an aqueous solution of ferrous ions and DL-malate or L-malate ions is formed, the improvement which comprises cooling a concentrated solution thereof to a temperature of about 10° to 50° C., whereby ferrous DL-malate trihydrate or ferrous L-malate trihydrate crystallizes out and recovering ferrous DL-malate trihydrate or ferrous L-malate trihydrate therefrom.
2. New products of the group of ferrous DL-malate trihydrate having the formula $Fe(DL-C_4H_4O_5) \cdot 3H_2O$ and ferrous L-malate trihydrate having the formula
$$Fe(L-C_4H_4O_5) \cdot 3H_2O$$
3. A product as claimed in claim 2, ferrous DL-malate trihydrate, $Fe(DL-C_4H_4O_5) \cdot 3H_2O$.
4. A product as claimed in claim 2, ferrous L-malate trihydrate, $Fe(L-C_4H_4O_5) \cdot 3H_2O$.

References Cited

FOREIGN PATENTS 45,077  1/1966  Germany.

OTHER REFERENCES

Franke, Annalen der Chemie, vol. 491, 1931, pp. 30–33.

DELBERT E. GANTZ, Primary Examiner

A. P. DEMERS, Assistant Examiner

U.S. Cl. X.R.

424—295